United States Patent
Walter

(10) Patent No.: US 8,032,179 B2
(45) Date of Patent: Oct. 4, 2011

(54) SYSTEM AND METHOD FOR MAKING AND RECEIVING CELLULAR TELEPHONE CALLS AT A WIRED ANALOG TELEPHONE DEVICE

(75) Inventor: Edward Walter, Boerne, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 643 days.

(21) Appl. No.: 10/969,327

(22) Filed: Oct. 20, 2004

(65) Prior Publication Data

US 2006/0084471 A1 Apr. 20, 2006

(51) Int. Cl.
 *H04B 1/38* (2006.01)
 *H04M 3/42* (2006.01)
(52) U.S. Cl. ............... 455/557; 455/90.3; 455/417
(58) Field of Classification Search .......... 455/90.3, 455/517, 445, 415–420, 461–463, 426.1, 455/557, 414.1, 422.1, 575.1
 See application file for complete search history.

(56) References Cited

U.S. PATENT DOCUMENTS

| | | | |
|---|---|---|---|
| 5,353,331 A | 10/1994 | Emery et al. | |
| 5,469,496 A | 11/1995 | Emery et al. | |
| 5,995,839 A | 11/1999 | Coursey et al. | |
| 6,073,031 A * | 6/2000 | Helstab et al. | 455/557 |
| 6,085,109 A * | 7/2000 | Koga | 455/552.1 |
| 6,091,949 A | 7/2000 | Sanchez | |
| 6,115,604 A * | 9/2000 | Lester et al. | 455/422.1 |
| 6,130,938 A | 10/2000 | Erb | |
| 6,185,427 B1 | 2/2001 | Krasner et al. | |
| 6,188,888 B1 | 2/2001 | Bartle et al. | |
| 6,208,854 B1 | 3/2001 | Roberts et al. | |
| 6,249,913 B1 * | 6/2001 | Galipeau et al. | 725/76 |
| 6,301,350 B1 | 10/2001 | Henningson et al. | |
| 6,320,534 B1 | 11/2001 | Goss | |
| 6,362,778 B2 | 3/2002 | Neher | |
| 6,373,817 B1 | 4/2002 | Kung et al. | |
| 6,480,593 B1 | 11/2002 | Munday et al. | |
| 6,516,060 B1 | 2/2003 | Foladare et al. | |
| 6,574,470 B1 | 6/2003 | Chow et al. | |
| 6,587,475 B1 | 7/2003 | Przygienda | |
| 6,704,580 B1 * | 3/2004 | Fintel | 455/550.1 |
| 6,735,432 B1 * | 5/2004 | Jarett et al. | 455/417 |
| 6,766,175 B2 * | 7/2004 | Uchiyama | 455/462 |
| 6,901,266 B2 * | 5/2005 | Henderson | 455/462 |
| 6,970,696 B1 * | 11/2005 | Fuoss et al. | 455/417 |
| 6,978,154 B1 * | 12/2005 | Ospalak et al. | 455/557 |
| 6,987,988 B2 * | 1/2006 | Uchiyama | 455/557 |
| 7,031,698 B1 * | 4/2006 | Appelman | 455/417 |
| 7,200,424 B2 * | 4/2007 | Tischer et al. | 455/567 |
| 7,463,726 B2 * | 12/2008 | Jensen et al. | 379/114.02 |
| 2001/0031645 A1 * | 10/2001 | Jarrett | 455/552 |
| 2003/0008680 A1 * | 1/2003 | Huh et al. | 455/557 |
| 2003/0181202 A1 * | 9/2003 | Link et al. | 455/417 |
| 2004/0266425 A1 * | 12/2004 | Gonsalves et al. | 455/426.2 |
| 2005/0025299 A1 * | 2/2005 | Tischer et al. | 379/199 |
| 2005/0025308 A1 * | 2/2005 | Tischer et al. | 379/413.02 |
| 2005/0239496 A1 * | 10/2005 | Sylvain | 455/552.1 |

\* cited by examiner

*Primary Examiner* — Brandon Miller
(74) *Attorney, Agent, or Firm* — Toler Law Group

(57) ABSTRACT

A cellular telephone docking station is provided and includes a semiconductor device that has a processor and a memory device that is coupled to the processor. An identification device is coupled to the semiconductor device and the identification device includes a docking station identification. The cellular telephone docking station also includes a cellular telephone cradle that is coupled to the identification device. Further, a computer program is embedded within the memory. The computer program includes instructions to verify that a cellular telephone identification matches the docking station identification. Additionally, the computer program includes instructions to transfer a cellular telephone service associated with the cellular telephone to the docking station. The computer program also includes instructions to disable the cellular telephone.

16 Claims, 4 Drawing Sheets

SYSTEM AND METHOD FOR MAKING AND RECEIVING CELLULAR TELEPHONE CALLS AT A WIRED ANALOG TELEPHONE DEVICE

FIELD OF THE INVENTION

The present disclosure relates generally to cellular telephone services.

BACKGROUND

Since wireless telephone technology has become more reliable and coverage has expanded, many users have decided to drop wired telephone services and use only wireless telephone services. Most people, while traveling, carry their wireless telephone with them and use wireless telephone services to stay in contact with others. However, when at home, a typical person does not carry his or her wireless telephone from room-to-room around the house. As such, when a telephone call is received, it is often a mad scramble to track down the wireless telephone to not miss the telephone call.

Accordingly, there is a need for an improved system and method for making and receiving cellular telephone calls at a residence.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
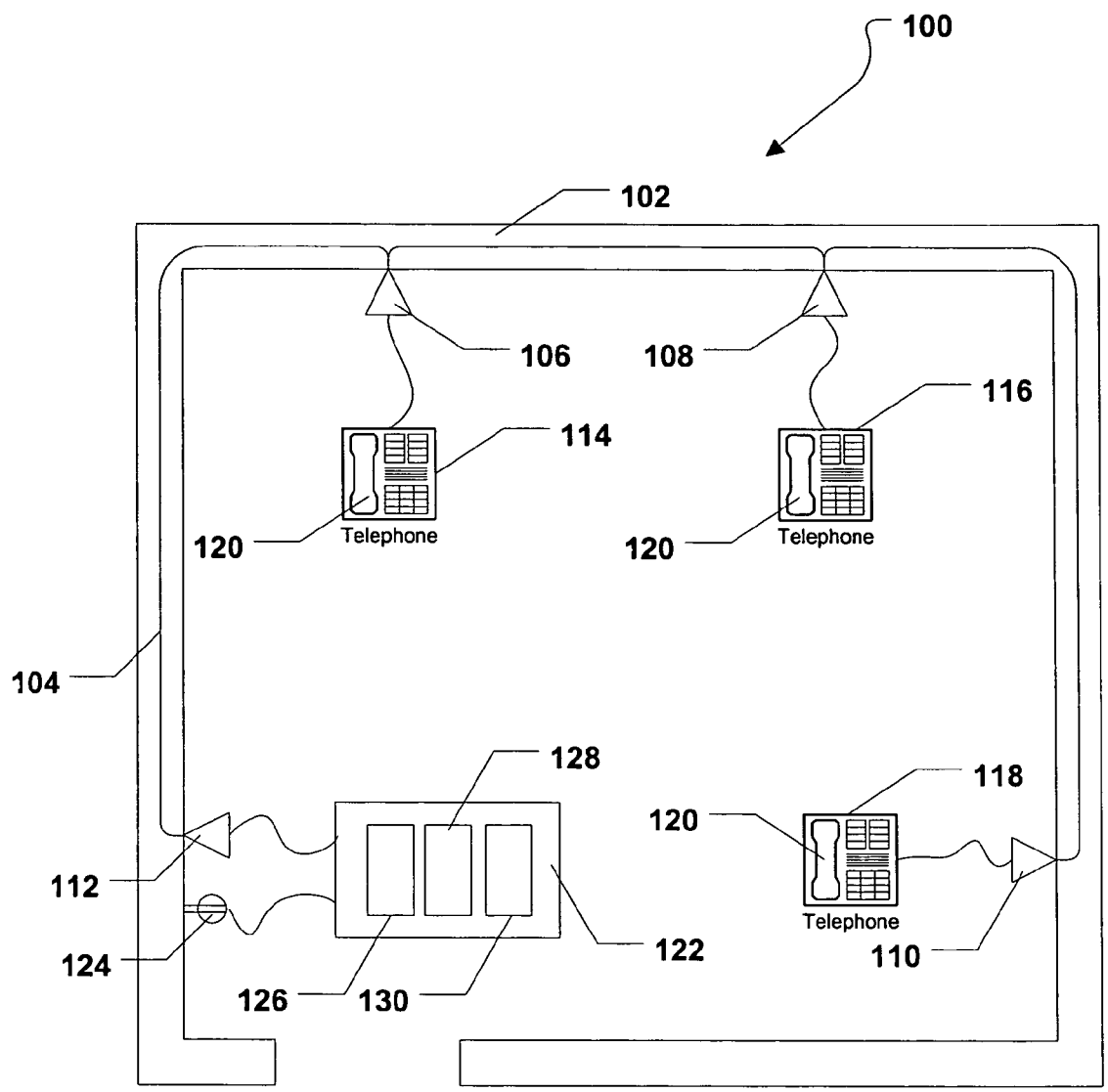
FIG. 1 is a general diagram of a telephone system.

A method for receiving a cellular telephone call at an analog telephone device is provided and includes detecting when a cellular telephone is docked at a docking station. When a cellular telephone is docked, the docking station determines whether a cellular telephone identification matches a docking station identification. If the telephone identification matches, a cellular telephone service associated with the cellular telephone is transferred to the docking station. Further, the cellular telephone is disabled. If the telephone identification does not match, the docking station indicates a mismatched cellular telephone.

In a particular embodiment, the docking station includes an analog telephone system connection. Further the method includes transmitting incoming cellular telephone calls to one or more analog telephone devices via the analog telephone system connection and a telephone wiring system. In a particular embodiment, the analog telephone system connection is an RJ-11 connection.

In another particular embodiment, the cellular telephone call is processed at a CDMA/GSM radio component within the docking station. Particularly, the incoming cellular telephone call is forwarded to a voice processor within the docking station. Also, a ring tone is generated across the telephone wiring system to one or more analog telephone devices. Further, the incoming cellular telephone call is transmitted to a particular analog telephone device via an analog telephone system connection when an analog telephone receiver is removed from a cradle at the particular analog telephone device. In a particular embodiment, a telephone number associated with the cellular telephone is transmitted to the analog telephone device.

In another embodiment, a method for making a cellular telephone call via an analog telephone device is provided and includes detecting when a cellular telephone is docked at a docking station and determining whether a cellular telephone identification retrieved from the cellular telephone matches a docking station identification. If the cellular telephone identification matches the docking station identification, a cellular telephone service associated with the cellular telephone is transferred to the docking station. Then, the cellular telephone is disabled. The method further includes detecting when an analog receiver is removed from a cradle at the analog telephone device. If an analog receiver is removed from the cradle at the analog telephone device, a dial tone is generated at a ring tone generator within the docking station. Further, the dial tone is transmitted from the docking station to the analog receiver.

In yet another embodiment, a cellular telephone docking station is provided and includes a semiconductor device that has a processor and a memory device that is coupled to the processor. An identification device is coupled to the semiconductor device and the identification device includes a docking station identification. The cellular telephone docking station also includes a cellular telephone cradle that is coupled to the identification device. Further, a computer program is embedded within the memory. In a particular embodiment, the computer program includes instructions to verify that a cellular telephone identification matches the docking station identification. Additionally, the computer program includes instructions to transfer a cellular telephone service associated with the cellular telephone to the docking station. The computer program also includes instructions to disable the cellular telephone.

In still another embodiment, a telephone system includes a wiring system. An analog telephone device is coupled to the wiring system. Further, a docking station is coupled to the analog telephone device via the telephone wiring system. The docking station includes a cradle that is configured to receive a cellular telephone. Also, the docking station is configured to transfer a cellular telephone service associated with the cellular telephone from the cellular telephone to the docking station.

Referring to FIG. 1, a telephone system is shown and is generally designated 100. As depicted in FIG. 1, the telephone system 100 is installed within a structure 102. In a particular embodiment, the telephone system 100 is installed within a dwelling, e.g., a house, a home, an apartment, a condominium, etc. In another particular embodiment, the telephone system 100 is installed within an office or a business. FIG. 1 shows that the telephone system 100 includes a telephone wiring system 104. A first telephone jack 106, a second telephone jack 108, a third telephone jack 110, and a fourth telephone jack 112 are coupled to the telephone wiring system 104. In a particular embodiment, each telephone jack 106, 108, 110, 112 is a registered jack 11 (RJ-11) type of telephone jack.

In a particular embodiment, a first analog telephone device 114 is coupled to telephone wiring system 104 via the first telephone jack 106. Further, a second analog telephone device 116 is coupled to the telephone wiring system 104 via the second telephone jack 108. Also, in a particular embodiment, a third analog telephone device 118 is coupled to the telephone wiring system 104 via the third analog telephone jack 110. FIG. 1 shows that each analog telephone device 114, 116, 118 includes an analog receiver 120. Each analog receiver 120 fits into a cradle (not shown) that is established by the analog telephone device 114, 116, 118.

FIG. 1 also illustrates a cellular telephone docking station 122 that is coupled to the telephone wiring system 104 via the fourth telephone jack 112. The cellular telephone docking station 122 is also coupled to a power outlet 124 adjacent to the fourth telephone jack 112. As indicated in FIG. 1, the cellular telephone docking station 122 is configured to receive one or more cellular telephones. In a particular embodiment, shown in FIG. 1, the cellular telephone docking station 122 can receive a first cellular telephone 126, a second cellular telephone 128, and a third cellular telephone 130. In another particular embodiment, more than one cellular telephone docking station 122 can be coupled to the telephone wiring system 104, e.g., in the case of an office building, apartment building, or condominium complex.

When one of the cellular telephones 126, 128, 130 is placed on the cellular telephone docking station 122 and the identification of the cellular telephone 126, 128, 130 matches the identification of the cellular telephone docking station 122, the particular docked cellular telephone 126, 128, 130 is disabled and cellular telephone service is transferred to the cellular telephone docking station 122. Thereafter, the cellular telephone docking station 122 can re-transmit cellular telephone calls via the telephone wiring system 104 to the analog telephone devices 114, 116, 118. Moreover, the analog telephone devices 114, 116, 118 can be used to make telephone calls via the cellular telephone network coupled to the cellular telephone docking station 122.

Figure 2:
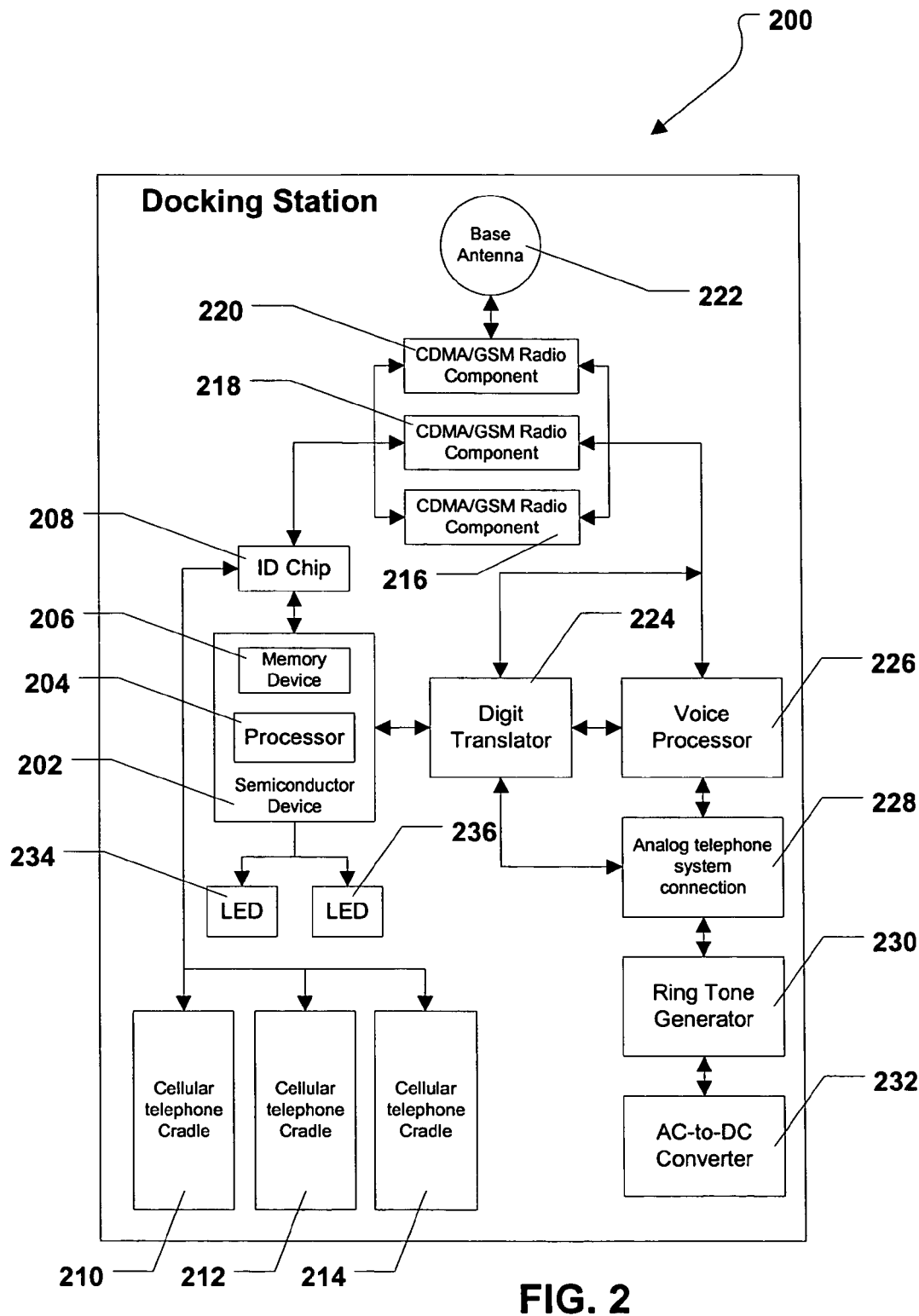
FIG. 2 is a general diagram of a cellular telephone docking station.

FIG. 2 illustrates an exemplary, non-limiting embodiment of a cellular telephone docking station that is generally designated 200. As depicted in FIG. 2, the cellular telephone docking station 200 includes a semiconductor device 202. The semiconductor device 202 includes a processor 204 and a memory device 206 coupled thereto. As further illustrated in FIG. 2, an identification device 208 is coupled to the semiconductor device 202. Moreover, a first cellular telephone cradle 210, a second cellular telephone cradle 212, and a third cellular telephone cradle 214 are coupled to the semiconductor device 202.

When a cellular telephone is placed in any of the cellular telephone cradles 210, 212, 214, the identification device 208 can verify the identification of the cellular telephone. If verified, the cellular service associated with the cellular telephone can be transferred to the cellular telephone docking station 200. Multiple cellular telephones can be used in conjunction with the cellular telephone docking station 200 and as such, the identification device 208 can verify multiple cellular telephones for use with the cellular telephone docking station 200. In a particular embodiment, the identification device 208 within the cellular telephone docking station 200 can be programmed with one or more electronic serial numbers that are associated with the one or more cellular telephones that can be used with the cellular telephone docking station 200. Further, when a cellular telephone is docked at the cellular telephone docking station 200, the electronic serial number associated with the cellular telephone is transmitted to the cellular telephone docking station 200. If the electronic serial number matches an electronic serial number programmed in the identification device 208, the cellular telephone is verified.

Still referring to FIG. 2, a first CDMA/GSM radio component 216, a second CDMA/GSM radio component 218, and a third CDMA/GSM radio component 220 can be coupled to the semiconductor device 202 via the identification device 208. Additionally, a base antenna 222 can be coupled to the CDMA/GSM radio components 216, 218, 220 and can be used to establish cellular connectivity to send and receive telephone calls via the cellular telephone docking station 200. Each CDMA/GSM radio component 216, 218, 220 corresponds to a cellular telephone associated with the cellular telephone docking station 200. FIG. 2 further shows a digit translator 224 and a voice processor 226 that are coupled to the CDMA/GSM radio component 216 and the semiconductor device 202.

In a particular embodiment, the digit translator 224 is used to receive a plurality of digits that represent a telephone number and the digit translator 224 holds those digits for a predetermined time frame and then, releases those digits to a CDMA/GSM radio component 216, 218, 220 to dial into the cellular telephone network coupled to the cellular telephone docking station 200. The voice processor 226 is used to process voice data packets received via the base antenna 222 and a CDMA/GSM radio component 216, 218, 220. Further, the voice processor 226 can be used to create voice packets from a user voice spoken into an analog telephone device coupled to the cellular telephone docking station 200 via a telephone wiring system within a home.

FIG. 2 also shows an analog telephone system connection 228 coupled to the digit translator 224 and the voice processor 226. The analog telephone system connection 228 can be an RJ-11 jack and can provide connectivity to an analog telephone device via a telephone wiring system within a home. As further depicted in FIG. 2, a ring tone generator 230 is coupled to the analog telephone system connection 228 and the semiconductor device 202. In a particular embodiment, the ring tone generator 230 can generate a ring tone when a cellular telephone call is received at the cellular telephone docking station 200 and transmit the ring tone to an analog telephone device coupled to the cellular telephone docking station 200. The ring tone generator 230 can also generate a dial tone and transmit the dial tone to the analog telephone device when an analog receiver is removed from a cradle at the analog telephone device. FIG. 2 also shows an alternating current-to-direct current (AC-to-DC) converter 232 that can be used to provide power to the various components of the cellular telephone docking station 200.

FIG. 2 also shows a first light emitting diode (LED) 234 and a second LED 236 coupled to the semiconductor device 202. In a particular embodiment, the LEDs 234, 236 can be used to indicate that the user has a voice mail stored at the cellular telephone docking station 200, or off site, or that the user has installed a cellular telephone into one of the cradles that does not match the cellular telephone docking station. Further, in another embodiment, the cellular telephone docking station 200 can include more than the two LEDs 234, 236 depicted in FIG. 2.

Figure 3:
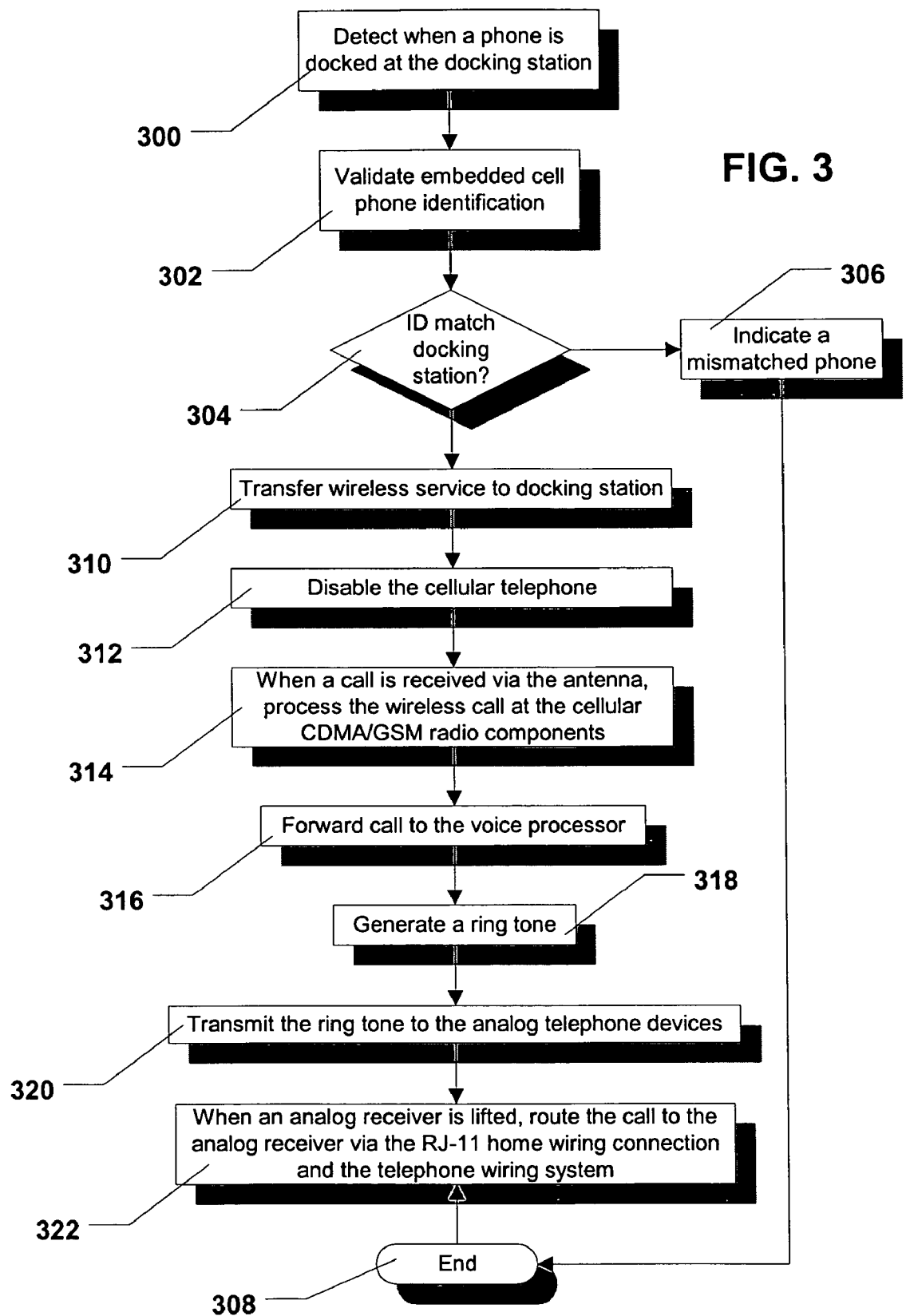
FIG. 3 is a flow chart to illustrate a method for receiving a cellular telephone call at an wire analog telephone device.

Referring now to FIG. 3, a method for receiving a cellular telephone call at an analog device is shown and commences at block 300. At block 300, the cellular telephone docking station detects when a phone is docked at the cellular telephone docking station. Moving to block 302, an embedded cellular telephone identification is validated by the docking station. At decision step 304, a determination is made as to whether the cellular telephone identification matches a cellular telephone docking station identification. If not, the method moves to block 306 and the cellular telephone docking station indicates a mismatched cellular telephone. In a particular embodiment, the cellular telephone docking station can indicate a mismatched cellular telephone by energizing an LED at the cellular telephone docking station. The method then ends at state 308.

Returning to decision step 304, if the cellular telephone identification matches the cellular telephone docking station identification, wireless service is transferred to the cellular telephone docking station at block 310. Thereafter, at block 312, the cellular telephone is disabled. At block 314, when a call is received at the cellular telephone docking station, the cellular telephone call is processed at the CDMA/GSM radio component within the cellular telephone docking station. Moving to block 316, the call is forwarded to the voice processor within the cellular telephone docking station.

Proceeding to block 318, the ring tone generator generates a ring tone. At block 320, the ring tone is transmitted to the analog telephone devices via the telephone wiring system. Moving to block 322, when an analog receiver at any of the analog telephone devices is lifted, the cellular telephone call is re-transmitted to the analog receiver via the analog telephone system connection and the telephone wiring system. The logic then ends at state 308. In a particular embodiment, the ring tone generator can generate different ring tones for different telephones. As such, when multiple cellular telephones are docked at the cellular telephone docking station, the cellular telephone docking station can indicate which cellular telephone is receiving a telephone call.

Further, in a particular embodiment, the cellular telephone docking station can transmit the telephone number of the cellular telephone that is being called to a caller identification screen of the analog telephone device. As such, when multiple cellular telephones are docked at the docking station, users can learn which telephone is ringing. Further, the cellular telephone docking station can provide forwarding of incoming calls to other telephones.

Figure 4:
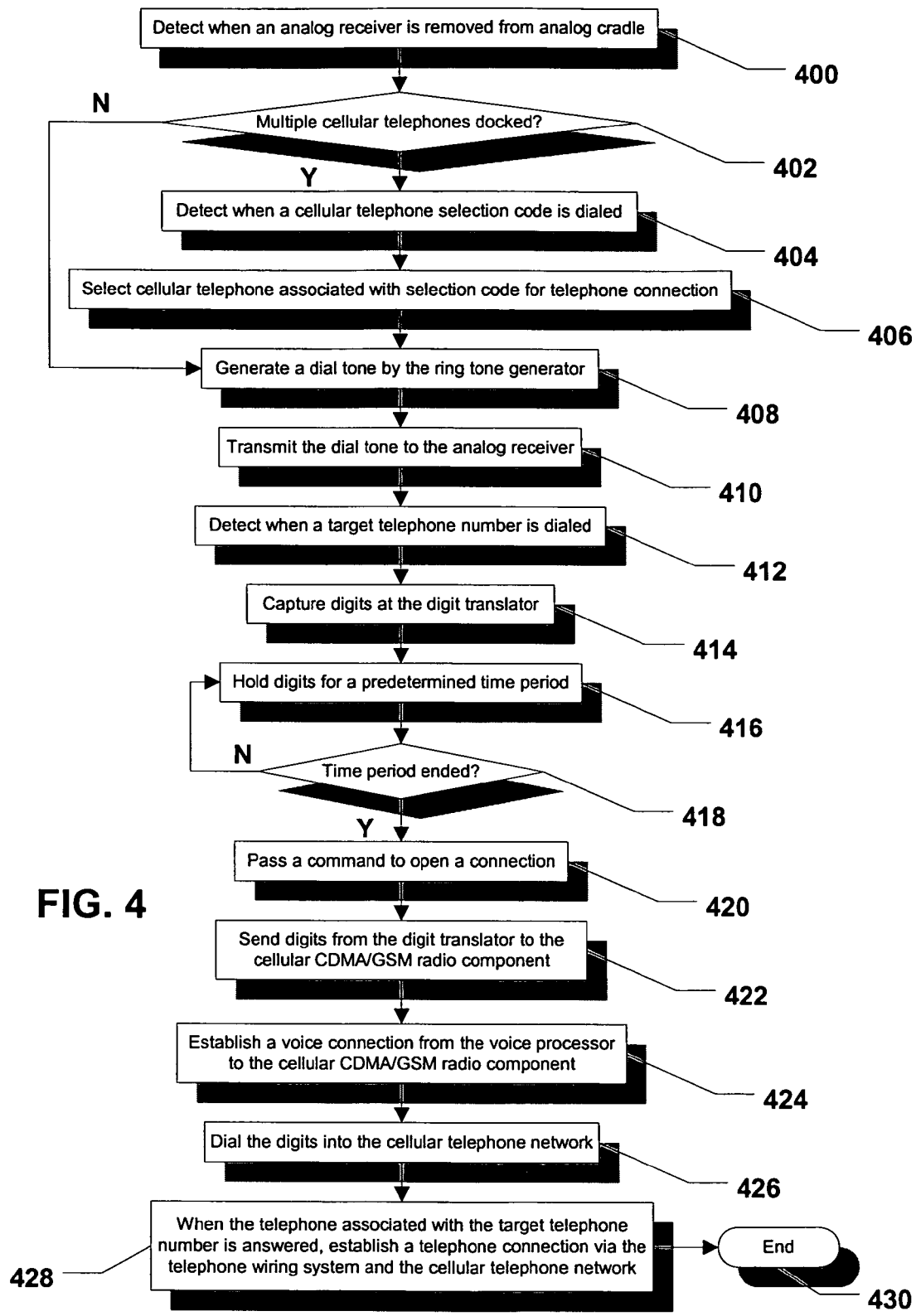
FIG. 4 is a flow chart to illustrate a method for establishing a telephone call at a wired analog telephone device via a cellular telephone network.

FIG. 4 depicts a method for establishing a telephone call at an analog telephone device via a cellular telephone network. Commencing at block 400, the cellular telephone docking station detects when an analog receiver is removed from a cradle at any of the analog telephone devices. At decision step 402, a decision is made as to whether multiple cellular telephones are docked at the cellular telephone docking station. If so, the cellular telephone docking station detects when a cellular telephone selection code is dialed at block 404. In a particular embodiment, the cellular telephone selection code can be a number followed by the pound sign. Proceeding to block 406, the CDMA/GSM radio component associated with the cellular telephone selection code is selected to establish a cellular telephone connection. The logic then moves to block 408. In a particular embodiment, if multiple cellular telephones are docked, each user can access the CDMA/GSM radio component corresponding to his or her cellular telephone via different analog telephone devices coupled to the cellular telephone docking station by dialing the selection code associated with his or her telephone. Further, when multiple cellular telephones are docked, the cellular telephone docking station can provide conference calling based on the number of cellular telephones that are docked at the docking station.

Returning to decision step 402, if multiple cellular telephones are not docked at the cellular telephone docking station, the logic continues to block 408. At block 408, the ring tone generator generates a dial tone. Next, at block 410, the dial tone is transmitted to the analog receiver. Moving to block 412, the cellular telephone docking station detects when a target telephone number is dialed at the analog telephone device. At block 414, the digits of the target telephone number are captured at the digit translator. As shown, the digit translator holds the digits for a predetermined time period at block 416.

Continuing to decision step 418, a determination is made as to whether the predetermined time period has ended. If not, the logic returns to block 416 and the digits continue to be held at the digit translator. After the predetermined time period ends, the method moves to block 420, a command is passed to the CDMA/GSM radio component in order to open a cellular connection. Next, at block 422, the digits of the target telephone number are sent from the digit translator to the cellular CDMA/GSM radio component. At block 424, a voice connection is established from the voice processor to the cellular CDMA/GSM radio component.

Continuing to block 426, the digits of the target telephone number are dialed into the cellular telephone network. Thereafter, at block 428, when the telephone associated with the target telephone number is answered, a telephone connection is established via the telephone wiring system and the cellular telephone network. The logic then ends at state 430.

With the configuration of structure described above, the system and method for making and receiving cellular telephone calls at a wired analog telephone device provides a way to allow a user to dock a cellular telephone at a cellular telephone docking station and receive cellular telephone calls at an analog telephone device coupled to the cellular telephone docking station.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a cellular telephone docking station, an electronic serial number from a first cellular telephone that is docked at the cellular telephone docking station;
   verifying that the electronic serial number received from the first cellular telephone is one of a plurality of electronic serial numbers that are stored at the cellular telephone docking station;
   detecting, at the cellular telephone docking station, when a telephone call is initiated via a telephone device that is communicatively coupled to the cellular telephone docking station;
   receiving a first cellular telephone selection code at the cellular telephone docking station when a plurality of cellular telephones are docked at the cellular telephone docking station, wherein a different cellular telephone selection code is associated with each cellular telephone of the plurality of cellular telephones, and wherein the first cellular telephone selection code corresponds to the first cellular telephone;
   selecting a cellular radio component of the cellular telephone docking station that is associated with the first cellular telephone based on the first cellular telephone selection code, wherein the cellular radio component of the cellular telephone docking station is independent of the plurality of cellular telephones that are docked at the cellular telephone docking station; and
   establishing a connection between the telephone device and a cellular telephone network using the cellular radio component of the cellular telephone docking station.

2. The method of claim 1, wherein the cellular radio component is at least one of a code division multiple access radio component and a global system for mobile radio component.

3. The method of claim 1, further comprising providing a conference call between the telephone device and the plurality of cellular telephones that are docked at the cellular telephone docking station.

4. The method of claim 1, further comprising:
detecting when a target telephone number is dialed via the telephone device;
capturing digits of the target telephone number; and
sending the digits of the target telephone number to the cellular radio component of the cellular telephone docking station.

5. The method of claim 4, further comprising:
transmitting the captured digits of the target telephone number via the cellular radio component of the cellular telephone docking station to the cellular telephone network.

6. A method comprising:
receiving a call at a cellular radio component integrated in a cellular telephone docking station via a cellular telephone network;
identifying a cellular telephone that is being called, wherein the cellular telephone is one of a plurality of cellular telephones that are docked at the cellular telephone docking station;
transmitting caller identification information that identifies the cellular telephone that is being called to a caller identification screen associated with a telephone device that is communicatively coupled to the cellular telephone docking station; and
transmitting the call to a receiver of the telephone device when the receiver transitions to an off-hook state,
wherein the cellular radio component integrated in the cellular telephone docking station is independent of the plurality of cellular telephones that are docked at the cellular telephone docking station.

7. The method of claim 6, further comprising:
generating a ring tone that identifies the cellular telephone that is being called, wherein a different ring tone is associated with each cellular telephone of the plurality of cellular telephones that are docked at the cellular telephone docking station; and
transmitting the ring tone that identifies the cellular telephone that is being called to the telephone device.

8. The method of claim 6, further comprising:
validating a cellular telephone identifier embedded in the cellular telephone after the cellular telephone is docked at the cellular telephone docking station;
transferring a wireless service from the cellular telephone to the cellular telephone docking station when the cellular telephone identifier is valid; and
disabling the cellular telephone.

9. The method of claim 8, further comprising indicating an error condition when the cellular telephone identifier is not valid.

10. The method of claim 6, further comprising processing the call at the cellular radio component of the cellular telephone docking station.

11. The method of claim 10, further comprising processing the call at a voice processor of the cellular telephone docking station.

12. The method of claim 11, further comprising generating a ring tone via a ring tone generator at the cellular telephone docking station.

13. The method of claim 12, further comprising transmitting the ring tone from the cellular telephone docking station to the telephone device.

14. The method of claim 6, wherein the cellular radio component of the cellular telephone docking station is one of a code division multiple access radio component and a global system for mobile radio component.

15. A cellular telephone docking station, comprising:
a semiconductor device including a processor and a memory device coupled to the processor;
an identification device coupled to the semiconductor device, the identification device including a docking station identifier;
a plurality of cellular telephone cradles coupled to the identification device; and
a plurality of cellular radio components coupled to the semiconductor device wherein the identification device verifies that a cellular telephone identifier embedded in a cellular telephone matches the docking station identifier after the cellular telephone is docked at one of the plurality of cellular telephone cradles, and
wherein each of the plurality of cellular radio components is independent of any cellular telephones docked at the plurality of cellular telephone cradles.

16. The cellular telephone docking station of claim 15, wherein each cellular radio component of the plurality of cellular radio components is one of a code division multiple access radio component and a global system for mobile radio component.

* * * * *